United States Patent [19]
Lowthian

[11] 3,934,064
[45] Jan. 20, 1976

[54] COMPOSITE STRUCTURES OF KNITTED GLASS FABRIC AND THERMOPLASTIC POLYFLUOROETHYLENE RESIN SHEET

[75] Inventor: Edwin Doll Lowthian, Newark, Del.

[73] Assignee: E. I. Du Pont de Nemours and Company, Wilmington, Del.

[22] Filed: Sept. 5, 1974

[21] Appl. No.: 503,464

Related U.S. Application Data

[63] Continuation-in-part of Ser. No. 201,862, Nov. 24, 1971, abandoned.

[52] U.S. Cl. .................. 428/36; 264/257; 428/174; 428/228; 428/253
[51] Int. Cl.² .................... B32B 17/02; B32B 27/12
[58] Field of Search ......... 161/88, 89, 189, 203, 93; 264/257, DIG. 53; 428/421, 422, 253

[56] References Cited
UNITED STATES PATENTS

| | | | |
|---|---|---|---|
| 3,594,262 | 7/1971 | Magidson | 161/89 |
| 3,723,234 | 3/1973 | MacDonald | 161/189 |

FOREIGN PATENTS OR APPLICATIONS

| | | |
|---|---|---|
| 1,222,380 | 2/1971 | United Kingdom |
| 1,284,605 | 8/1972 | United Kingdom |

Primary Examiner—George F. Lesmes
Assistant Examiner—P. J. Thibodeau

[57] ABSTRACT

Extensible structures are made by partially embedding a selected knitted glass fabric into a perhalopolyfluoroethylene polymer resin sheet. The embedding can be done by pressing the glass fabric into one surface of the sheet heated to a temperature at which it is soft. The resultant composite structure is thermoformable into such shapes as a dished head. The exposed surface of the glass fabric can be impregnated with a castable material useful for such purposes as adhering the composite structure to a substrate such as a metal surface or for reinforcing the composite structure. The composite structure instead of being thermoformed can be rolled and seamwelded into a cylinder shape which can be used as a cylindrical tank lining or as a duct.

10 Claims, 18 Drawing Figures

COMPOSITE STRUCTURES OF KNITTED GLASS FABRIC AND THERMOPLASTIC POLYFLUOROETHYLENE RESIN SHEET

CROSS-REFERENCE TO RELATED APPLICATIONS

This application is a continuation-in-part of my application Ser. No. 201,862, filed Nov. 24, 1971 now abandoned.

BACKGROUND

The present invention relates to composite structures of glass fabric and thermoplastic resin. More specifically, it is directed to such structures wherein the glass fabirc is knitted, the resin is a perhalopolyfluoroethylene polymer resin in sheet form and the fabric is partially embedded in one surface of the fabric.

U.S. Pat. No. 3,446,686 discloses laminating sheets of plastic to fabric for reinforcement purposes, followed by forming a shaped article from the resultant laminate. The patent discloses that the disadvantage of this method is that the fabric has a limited degree of elongation and thus tends to rupture during the forming step. The patent further discloses overcoming this disadvantage by laminating the fabric to the plastic during the forming step. This is accomplished by placing a sheet of thermoplastic material over the adhesive coated surface of knitted glass fabric, heating the sheet of thermoplastic material and drawing the sheet and fabric into the mold to form the shaped article. Upon cooling, the adhesive adheres the fabric to the molded sheet of thermoplastic material. This approach has the disadvantage of the adhesive being the weak link in the composite structure.

SUMMARY OF THE INVENTION

The present invention provides a composite structure of a selected knitted fabric and a selected thermoplastic resin which is moldable, i.e., thermoformable, after the composite structure is made and which does not require adhesive for structural integrity of the composite structure. More specifically, the composite structure of the present invention comprises a substantially flat thermoformable sheet of a melt-fabricable perhalopolyfluoroethylene polymer resin and a knitted fabric made of glass fiber yarn and at least one monofilament of a melt-fabricable perhalopolyfluoroethylene polymer resin, said fabric being partially embedded in a surface of said sheet.

In one embodiment of the present invention, the composite structure can be thermoformed into the shape of a dished head of a chemical process vessel. In another embodiment, the composite structure can be shaped into a cylinder which is useful for example as ducting or as a cylindrical tank lining.

DESCRIPTION OF THE DRAWINGS

These embodiments of the invention will be discussed in further detail hereinafter with reference to the drawings in which.

DESCRIPTION OF THE INVENTION

Figure 1:
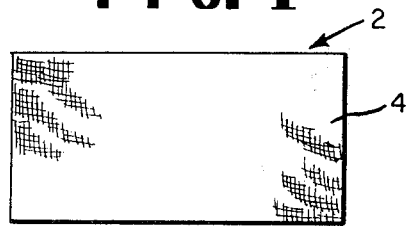
FIGS. 1 and 2 show a plan view and a side view, respectively, of a composite structure of the present invention.
Figure 2:
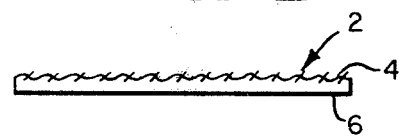

FIGS. 1 and 2 illustrate a composite structure 2 of the present invention comprising two basic components, viz., a knitted glass fabric 4 and a sheet 6 of a perhalopolyfluoroethylene polymer resin partially embedded in the fabric, i.e., part of the sheet cross-section is coextensive with part of the fabric cross-section, with the fabric forming one surface of the structure 2 and the sheet forming the opposite surface.

Figure 3A:
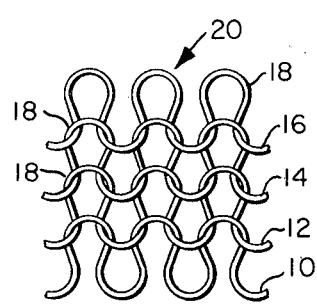
FIGS. 3a and 3b show in enlargement a plan view of two pieces of a knitted glass fabric that can be used to make composite structures of the present invention.
Figure 3B:
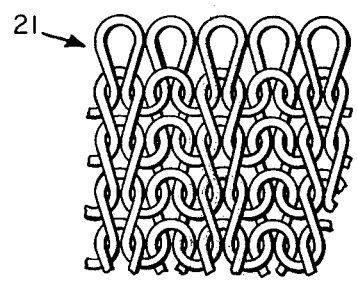

To describe the fabric component in greater detail, it is composed of a continuous yarn or set of yarns in the form of courses or rows of loops, each row of loops being caught in the previous row of loops, which fabric can be described as a knitted fabric. To illustrate, FIG. 3a shows a series of yarns 10, 12, 14 and 16, each forming a row of loops 18 caught in the previous (and subsequent) row, to form fabric 20 of plain knit structure. Any type of knit can by used in the fabric employed in the present invention; for example, in addition to the plain (purl) knit, such knits as the flat (jersey) knit, the raschel knit, the rib stitch, and the tricot stitch can be used. Fabrics that are knitted double and are held together by binding stitches, which are known as double knit fabrics can also be used. FIG. 3b illustrates the double knit construction of fabric 21 that can be used in the present invention. Variations on the basic knitting stitch can be used, such as the tuck stitch, wherein periodically in the knitting operation loops at desired intervals are left unknitted so as to form a knobby or bumpy surface on one or both sides of the knitted fabric which increases its apparent thickness.

All of these types of knits have in common the feature of loops of the yarn making up the fabric extending from each surface of the fabric and of being extensible in all directions. Generally an extensibility (without breaking) of at least 10 percent in all directions is desired for the fabric, with some applications requiring at least 20 percent extensibility (based on original dimension of the fabric). The composite structure incorporating the fabric will have corresponding extensibility.

Figure 4:
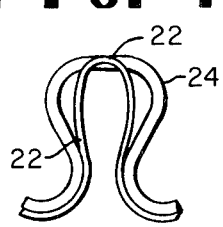
FIG. 4 shows in further enlargement a single loop of yarn (from a knitted glass fabric) containing a monofilament of a melt-fabricable perhalopolyfluoroethylene polymer resin.

The knitted fabric is composed of a yarn made of glass fibers and monofilaments of a thermoplastic, i.e., melt-fabricable, perhalopolyfluoroethylene polymer. Glass fiber yarn is used instead of glass monofilament because of the relative fragility of the monofilament. The melt-fabricable perhalopolyfluoroethylene polymer fibers are illustrated as fibers 22 in the single loop 24 of glass yarn shown in FIG. 4. The fiber 22 can be present essentially separate from the glass fibers, i.e., not twisted therewith, as shown in FIG. 4 in which case the greater elasticity of the glass fibers cause them to have a greater radius of curvature than the loop of thermoplastic fiber 22. Typically, however, the fiber 22 will be intertwined with the glass fabric either by twisting before knitting or caused by the knitting maching during knitting.

With respect to the melt-fabricable perhalopolyfluoroethylene polymer resin sheet component of the composite structure, the sheet can be made by conventional film fabrication techniques from a melt-fabricable perhalopolyfluoroethylene polymer resin. The resin softens sufficiently upon the application of heat to encapsulate loops of glass yarn of the knitted fabric component when subjected to moderate pressure. The resin should be of sufficiently high molecular weight to be capable of forming self-supporting film of sufficient toughness as to be flexed at least 90° without breaking. Generally, the resin will have a number average molecular weight of at least 20,000.

The melt-fabricable polymers of the perhalopolyfluoroethylene include the homopolymer of chlorotrifluoroethylene and copolymers of it or tetrafluoroethylene with perfluorinated vinyl monomers such as hexafluoropropylene, or with perfluoroalkyl vinyl ether monomers such as perfluoropropyl- or ethyl- vinyl ether, or with nonfluorinated monomers such as alkylenes, e.g., ethylene, including the tetrafluoroethylene/ethylene binary polymers and terpolymers disclosed in U.S. Pat. Nos. 3,624,250 and 3,342,777. Generally, the comonomers will have no more than 6 carbon atoms. Preferably the melt-fabricable polymer will be a tetrafluoroethylene copolymer that has sufficient other monomer (i.e., monomer other than tetrafluoroethylene) copolymerized with the tetrafluoroethylene to render the copolymer melt-fabricable, i.e., to have a specific melt viscosity of less than $10^7$ poises measured at 380°C. under a shear stress of 0.455 kg./cm. The amount of other monomer required will vary depending on which monomer is used, but will generally be from 3 to 40 percent based on the weight of the copolymer. The thickness of the sheet will vary with the application ivolved but typically will be from 0.127 to 6.47 mm.

The knit fabric and sheet of perhalopolyfluoroethylene polymer resin can be made into composite structures of the present invention by stacking the fabric and sheet on top of one another and applying sufficient heat and pressure to cause the surface of the fabric in contact with the sheet to embed in the sheet. The embedment is characterized by at least sufficient penetration of the loops of the fabric into the sheet to provide a mechanical bond between the fabric and the sheet. The sheet may even encapsulate the loops of one surface of the fabric, but this condition is not absolutely necessary for all applications since mechanical bonding is obtained merely by the resin either penetrating the yarn fibers or contacting the yarn of the loops through an angle of greater than 180° around the yarn circumference or both. While at least this minimum penetration of the sheet into the fabric is desired, total encapsulation of the fabric by the sheet would be undesirable because this would deprive the composite structure of exposed fabric loops desired for anchoring to a castable material backing. Typically, penetration of the sheet into no more than an average of 50 percent of the thickness of the fabric is desired.

Since the bond between fabric and sheet is mechanical, no adhesive coating on the glass or sheet is needed. The presence of monofilaments of a melt-fabricable perhalopolyfluoroethylene in the glass yarn making up the fabric, however, can provide a fused bond between the fabric and the sheet, providing the respective resins from which the sheet and the monofilament are made are compatible and sufficiently close in melting point. Usually, in such embodiment, the respective resins will be the same. The presence of the monofilament in the yarn need not be for this purpose but, instead, can be present for the purpose of stabilizing the fabric (maintain uniformity of knit construction), reducing its breakage on handling and maintaining its bulk. Generally, less than 50 percent of the monofilament based on the total weight of the yarn is required to attain these results. Higher proportions of such monofilament can be present, such as up to 75 percent of the total yarn weight, especially where the resin is relatively dense and the glass yarn relatively bulky.

One method for applying the heat and pressure to the stack of fabric and sheet to laminate them together is to use a heated press, maintaining the pressure on the stack for a sufficient duration to obtain the composite structure desired. The temperature used will be at least as high as the crystalline melting temperature of the resin and will further depend on the melt viscosity of the resin and the pressure and dwell time of the pressing operation. In the case of amorphous resins wherein identification of the melting temperature is arbitrary, the resin is merely heated at a high enough temperature until the resin is flowable enough to flow into the fabric. The pressure used should not be so high as to permanently crush the exposed loops of the knit fabric. While applying pressure to the knit fabric invariably causes some flattening of the loops of the fabric, release of the pressure, if not excessive, enables the exposed loops (not embedded in the sheet) to spring back toward their original form. By reheating the composite structure, the springback of the exposed loops is increased.

Figure 5:
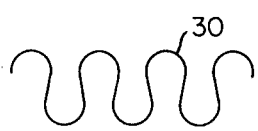
FIG. 5 shows schematically the approximate configuration of a course of yarn of a knitted glass fabric.
Figure 6:
FIG. 6 shows schematically the configuration of the course of yarn of FIG. 5 upon stretching.

The stretchability (or extensibility) of the knit fabric in the resultant composite structure enables the composite structure to be formed or molded such as by thermoforming to a shaped article. Thermoforming is the process for drawing the composite structure into a three dimensional article. The stretchability of knit fabric is illustrated by yarn 30 representing a single row of loops of a knit fabric in the relaxed condition in FIG. 5 and in the extended condition in FIG. 6. In essence, the loops tend to straighten out when stretched. similarly, the same yarn having its lower loops encapsulated in a sheet 32 of the melt-fabricable polymeric resin appears as in FIG. 7 in the relaxed condition and as in FIG. 8 after the sheet 32 is stretched. The relationship between yarn and sheet depicted in FIGS. 7 and 8 is repeated in each row of yarn of the knit fabric in composite structures of the present invention.

Figure 7:
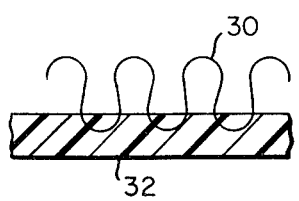
FIG. 7 shows schematically the course of yarn of FIG. 5 partially embedded in the cross-section of a sheet of a melt-fabricable perhalopolyfluoroethylene polymer resin.
Figure 8:
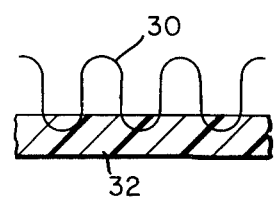
FIG. 8 shows schematically the resultant composite structure of FIG. 7 after stretching.
Figure 9:
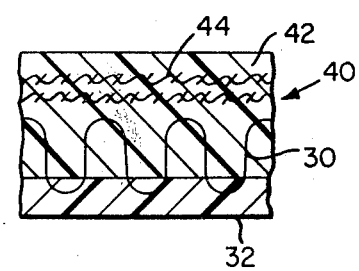
FIG. 9 shows schematically the composite structure of FIG. 8 with a backing of castable material.

The exposed loops of yarn of the knit fabric in the composite structure, e.g., as depicted by the loops not encapsulated by the sheet 32 in FIGS. 7 and 8, serve as an anchor for a layer of castable material 42 which encapsulates the enclosed loops of the fabric and further encapsulates reinforcing material 44 such as cloth or fiber as shown in FIG. 9. According to this embodiment of the present invention, while the composite structure consisting of knit fabric (represented as yarn 30) and sheet 32 of thermoplastic resin provides a moldable article possessing the surface characteristics of the sheet, the castable material 40 can be used to strengthen the composite structure. The castable material can itself reinforce the composite structure or can serve to adhere the composite structure to a substrate which, in turn, provides reinforcement. The castable material can be applied to the composite structure either before stretching or after stretching or otherwise forming a shaped article and will prevent further stretching.

Any material which is sufficiently flowable to encapsulate the exposed loops of the knitted fabric of the composite structure and which is subsequently hardenable to an adhesive or rigid cast material or reinforced cast material can be used as the matrix (or entire) portion of the castable material. Preferably, the castable material impregnates the knitted glass fabric sufficiently to meet the plastic resin sheet in the interior of the fabric. For example, the castable material can be a thermosetting type resin such as epoxy resin or polyester. Penetration of the castable material into the exposed yarn loops of the knitted glass fabric mechanically anchors the castable material to the composite structure.

Since the castable material is secured to the composite structure by mechanical engagement with the knitted fabric, it is important that the yarn of this fabric be strong. For this reason, glass is the predominant material of construction of the knitted fabric of the composite structures of the present invention. The glass also supplies high temperature and corrosion resistance desired for many applications.

The loop density of the knitted glass fabric should be sufficient to maintain integrity between the melt-fabricable polymeric resin sheet and the castable material. A plain knit construction obtained by knitting with 3½ needles per inch provides sufficient loop density for some applications; however, the plain knit obtained by knitting with at least 7 needles per inch is more preferred. In the case of double knits, the use of at least 3½ needles per inch gives better results because the knitting involves two sets of needles, or a total of 7 meedles. In addition to loop density, the loop should be sufficiently large to provide the bulk desired for enabling their encapsulation by castable material as well as to achieve the extensibility desired. This is accomplished by adjustment of the amount of yarn fed per needle of the knitting machine. The effectiveness of glass knits where the loop density is borderline can be increased by increasing the loop length or bulkiness of the fabric to insure that each loop becomes encapsulated by the castable material. The loops should not be so long, however, that the knitted fabric is unstable during handling. The knitted fabric need not be the same on both sides. For example, the side embedded in the melt-formable polymeric resin sheet can be a relatively smooth side, whereas the exposed side can be ribbed in order to provide more bulk for impregnation by castable material which ordinarily will not involve pressure but just the flowability of the castable material.

When the castable material is to provide reinforcement to the composite structure, the reinforcing material 44 embedded in the castable material provides further reinforcement. Examples of reinforcing material include glass fibers, roving, and mat which can be used in the conventional laying up process of coating the knitted fabric with castable material, applying the reinforcing material to the surface of the castable material while still flowable, coating the reinforcing material with additional castable material, applying additonal reinforcing material, and so on. This method is especially useful for applying a polyester/glass mat, chopped glass roving backing material to the composite structure. Another procedure is to simultaneously coat the fabric surface of the composite structure with castable material and chopped glass strand. Still another procedure is the spiral winding technique of laying down continuous filament yarn or roving of glass within the polyester. The thickness of the castable material when used for reinforcement will depend on the strength and rigidity desired.

When used as an adhesive, the thickness of the castable material will depend on the thickness at which the desired adhesive effect is obtained. A preferred adhesive is epoxy resin.

Prior to coating the knitted fabric side of the composite structure with castable material or prior to making the composite structure, any sizing agent that is on the glass fabric that may interfere with either the resin or castable material penetration into the fabric or which degrades during treatment can be removed by such operations as heating to burn off the sizing or water and solvent soaking. An agent which makes the fabric more wettable, especially to the castable material, can be applied to the knitted glass fabric. An example of such an agent is the water-hydrolyzable organo silanes such as those disclosed in German Patent Publication No. 1,954,233.

The composite structures are useful, in general, to form articles having the melt-fabricable polymeric resin sheet as one surface and knitted glass fabric as the opposite surface. The knitted glass fabric provides some stiffness to the sheet. The composite structures can be used in such applications as structural articles, molds, mold liners, and linings in general for such applications as ventilation hoods, ducts and bench top covers, with the need for castable material to back-up the composite structure depending on the application.

The composite structures of the present invention are especially useful as a liner because the linings that are most chemically resistant, viz., halogenated olefins, such as the melt-fabricable copolymers of tetrafluoroethylene, are also the most difficult to adhere to support surfaces such as plastic or metal substrates. Chemical treatment of the copolymers, such as by sodium etching, increases the ability of the copolymer to adhere to a support surface, but the adhesive bond with the support surface has not been sufficiently permanent as is obtained in the present invention. Once the bond between the lining and the support surface breaks, the resultant void becomes a point of intense corrosion caused by permeation of the chemicals in contact with the lining therethrough. The present invention has the advantage of achieving bonding between the lining and the support surface through the more permanent, less chemically affected mechanical type of bond via knitted glass fabric.

One main advantage over prior fabric/plastic laminates is the ability of the composite structures of the present invention to be thermoformed. Thermoforming involves a stretching of the melt-fabricable polymeric resin sheet and extension of the knitted glass fabric to the shape desired.

Figure 10:
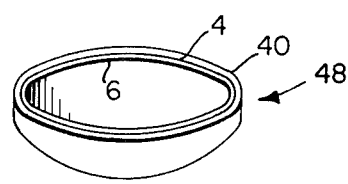
FIG. 10 shows an isometric view of a dished head formed from a composite structure of the present invention.
Figure 11:
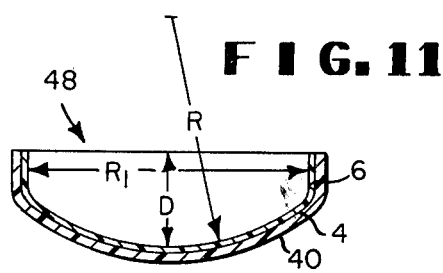
FIG. 11 shows a cross-sectional view of the dished head of FIG. 10.

One shaped article which can be made from composite structures of the present invention is a dished head 48 for a chemical process vessel comprising an inner sheet 6 of the melt-fabricable polymeric resin and a knitted glass fabric 4 running intermediate the thickness of the head, to form composite structure 2 such as shown in FIG. 1 and an outer layer of castable material 40 which in this case is glass-reinforced polyester, as shown in FIGS. 10 and 11. Dished heads normally have an inside dished radius R which is 80 to 100 percent of the inside diameter $R_1$ of the head and a depth D of at least 20 percent of the inside diameter. Heretofore, fabric/plastic laminates have not had sufficient thermoformability to be molded into dished heads. Instead, the laminates were cut into orange peel shape and then pieced and bead-welded together in the dished head configuration, a time-consuming and expensive operation which was often not satisfactory because the numerous seams in the head all served as points for possible leakage. The composite structures of the present invention provide a junction-free lining for the dished head. While the dished head shown in FIGS. 10 and 11 form the entire dished head of the process vessel, composite structures of the present invention can be used as dished head liners adhered to a metal substrate.

A process for molding composite structures such as to the dished head shape of FIGS. 10 and 11, without creating thin spots in the sheet 6, involves uniformly heating a sheet of the composite structure and allowing it to sag under its own weight to approximately the same surface area as that of the shaped article, followed by shaping the composite structure to the article shape desired, and cooling the structure so as to retain this shape.

Figure 16:
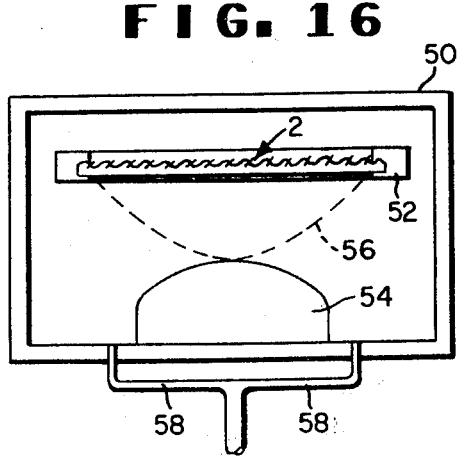
FIGS. 16 and 17 show schematically in side elevation apparatus for and the steps to thermoform a composite structure of the present invention.

In greater detail, FIG. 16 shows an oven 50 in which is positioned a rectangular frame 52 (front side removed for purposes of clarity) which supports the periphery of a composite structure 2 fabric side up. The composite structure lies over a male mold 54 positioned within the oven and having the shape desired for the inner surface of a dished head. Upon heating, the composite structure sags so that its unsupported region takes the shape indicated by dashed line 56 which (in cross-section) is approximately a catenary curve. The stress throughout the unsupported region of the composite structure during this sagging is about equal so that the thinning of the resin sheet of the composite structure is uniform. This sagging is accompanied by a corresponding amount of stretching of the knitted fabric component of the composite structure. The temperature of heating used will depend somewhat on the resin employed as the melt-fabricable polymeric sheet in the composite structure, but usually the temperature will be well above the crystalline melting temperature of the resin so that the sagging occurs during heat-up of the oven, and then the heating is stopped when the amount of sagging desired is complete.

Figure 17:
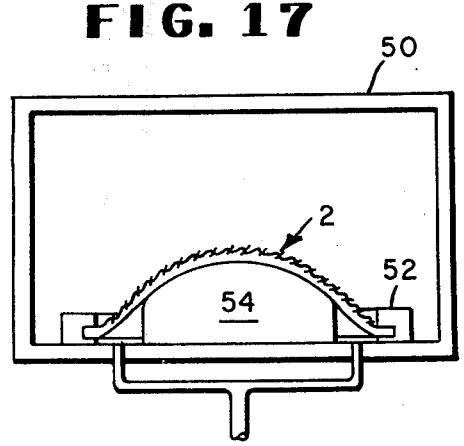

The mold 54 is positioned beneath the sagging composite structure at a distance wherein when the unsupported region of the composite structure touches the mold, the surface area of the sagged composite structure and of the mold are about the same. This provides visual indication of when the composite structure should be shaped. At this time, frame 52 is lowered to encompass the mold and allow the composite structure to drape over and assume the configuration of the mold (as shown in FIG. 17). To obtain fitting of the composite structure about the vertical circumference of the mold, a vacuum is applied beneath the composite structure in this region by supply lines 58 (only two shown) connected to a vacuum source (not shown). The vacuum can also be communicated through the mold to its surface to insure desired shaping of the composite structure. This use of vacuum to draw the heated composite structure down onto the mold can be called "vacuum shaping." The resultant molded or shaped composite structure has a fairly uniform sheet thickness (greatest and smallest thickness within 75 percent of one another), and is cooled sufficiently while in contact with the mold to be able to sustain its shape when removed from the mold. The shaped composite structure is then released from the frame 52 and is trimmed as desired. The reinforcing castable material backing such as a glass-reinforced polyester or adhesive-metal substrate is then applied to the fabric side of the shaped article as hereinbefore described.

Composite structures of the present invention can also be shaped into articles which do not involve thermoforming such as into cylinder 60 (FIG. 12) by wrapping the composite structure around a mandrel (resin side facing the mandrel) to meet itself, followed by conventional heat sealing technique to weld the abutting edges 62 of the composite structure together. For example, the glass fabric is stripped back from the abutting edges on the glass side of the composite structure, and the edges and a bead of thermoplastic resin are heated in contact with one another sufficiently that they heat bond together. A castable material 40 can then be applied to the fabric side of the cylinder; in this case the castable material can be glass-reinforced polyester. The cylinder can then be removed from the mandrel and a bead of thermoplastic resin can be welded along the abutting edges on the mandrel side of the composite structure. The resultant cylinder 60 can be used as the cylindrical section of a process vessel. Alternatively, the castable material can be an adhesive for adhering the cylinder to the interior surface of a metal cylinder for process vessel application. In either event, the sheet 6 of the dished head 48 of FIG. 10 can be welded through a bead of thermoplastic resin along the upper edge of the head to the lower edge of sheet 6 of cylinder 60 to form a continuous lining between the bottom and side of the process vessel.

Figure 13:
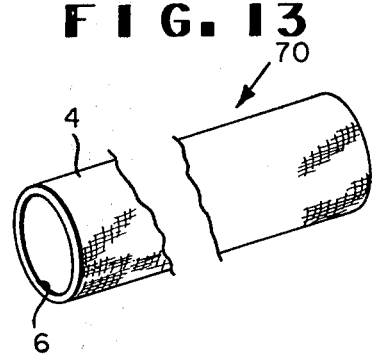
FIG. 13 shows an isometric view in undeterminate length of a composite structure of the present invention in the shape of a cylinder of high length to diameter ratio such as would be useful for ducting.

Another application for composite structures of the present invention is to form a duct 70 of much greater length to diameter ratio wherein the inner surface is the melt-fabricable polymeric resin sheet 6 and the outer surface is the knitted glass fabric 4, such as the tube shown in FIG. 13. Such duct can be made by the same conventional technique as the cylinder 60. The stretchability of the composite structure enables its ends to be heated and flared for joining with other ducts or cylindrical shapes.

Figure 12:
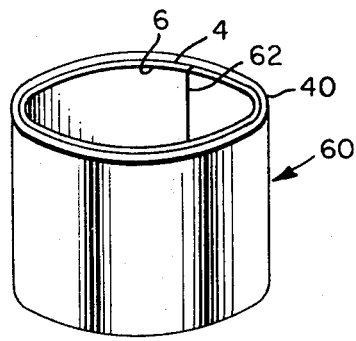
FIG. 12 shows an isometric view of a composite structure of the present invention formed and seamed into a cylinder of low length to diameter ratio such as would be useful as a vessel sidewall.
Figure 14:
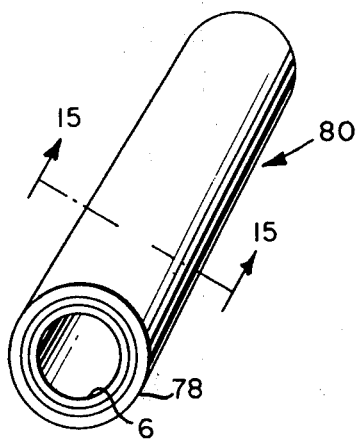
FIG. 14 shows duct made from the cylinder of FIG. 13.
Figure 15:
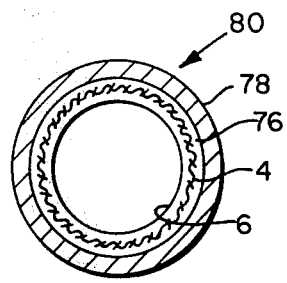
FIG. 15 shows a cross-section along line 15—15 (in enlargement) of the duct of FIG. 14.

As in the case of dished head 48 and cylinder 60 shown in FIGS. 10 and 12, respectively, the duct 70 can be combined with reinforcing castable material, such as glass-reinforced polyester, to form an essentially plastic rigid duct. Alternatively, the castable material can be an adhesive 76 which bonds the composite structure to the inner wall of metal tubing 78 to form a lined duct 80 such as shown in FIGS. 14 and 15 (cross-hatching of resin 6 and adhesive 76 omitted for clarity).

Composite structures of the present invention can be shaped into cylindrical shapes having cross-sections other than round, e.g., square or rectangular cross-sectional shapes can be formed.

Composite structures of the present invention are further illustrated by the following examples:

EXAMPLE 1

The knit fabric used in this Example was a plain double knit, west construction cardigan employing a tuck stitch knitted from 7 needles per inch per side (total of 14 needles per inch) using ECG 150 fiberglass yarn containing 45 percent by weight (total yarn basis) of 0.013 cm. diameter oriented monofilament of commercially available high molecular weight copolymer of tetrafluoroethylene/hexafluoropropylene (15–20 percent by weight hexafluoropropylene) having a melting point of about 270°C. The yarn was composed of two strands of glass yarn, one turn Z and the other turn S and two strands of the copolymer monofilament. The fabric was desized by soaking for 30 minutes in an aqueous solution of 1 percent by weight of an enzyme (Rhozyme) and 2% NaCl heated to 60°C., followed by adding 5 percent by weight of Varsol solvent and 2½ percent by weight each of Triton X-45 and X-100 surfactant to the solution and further soaking for 20 minutes at 80°C., and water washing (overflow rinse) and finally acetone washing and drying of the fabric.

A piece of this fabric, 47.3 cm. square in the relaxed condition, was laid on top of a 45.7 cm. square sheet, 0.15 cm. thick, of the above copolymer in a press. Sheets of 0.008 cm. aluminum 51 cm. square were placed between the fabric/sheet and their respective press platens, and a pressure equalizing pad was placed between the lower press platen and bottom sheet of aluminum. The press, preheated (heat supplied by upper platen) and maintained during pressing at 276°C. ± 50°C., was closed and a pressure of 0.35 kg./cm.$^2$ (resin sheet basis) was applied for 10 minutes. The pressure was released and after cooling of the composite structure, the aluminum sheets were stripped therefrom. The bond strength between the knitted fabric and the resin sheet was 75 lbs./inch of width (1,340 kg./m.) such as measured in a 180° peel test, as compared to about 8 to 10 lbs./inch of width (140 to 180 kg./m.) for the same copolymer etched and epoxy bonded to a metal substrate. The knitted fabric left a deep impression in the sheet as could be observed in the sheet peeled from the fabric. The knitted fabric surface of the composite structure had sufficient standoff for penetration by castable back-up material. The composite structure can be thermoformed using the equipment and procedure of FIGS. 16 and 17 followed by applying castable material which can be done by spreading polyester lay up resin over the fabric and padding the resin into the fabric using a grooved roller followed by adding alternate layers of glass mat and chopped glass roving along with the polyester to build up to a back-up thickness of about 0.6 cm.

Sismilar laminates of the same knitted fabric with sheets of other tetrafluoroethylene copolymer resins such as copolymers of tetrafluoroethylene with ethylene or propylene or perfluoro(propyl vinyl ether) can be made, except that the resin monofilament in the yarn would preferably have the same identity as or be compatible with the resin in the sheet. The laminating conditions, viz., temperature, pressure, and dwell time would depend on the melt characteristics of the resins.

Repeat of the above Example but using 11 mil diameter meter copolymer monofilament gave a fabric which was somewhat stiffer in handling.

EXAMPLE 2

The fabric used in this Example was the same construction as used in Example 1, and essentially the same laminating procedure as used in Example 1 was used in this Example, except as otherwise indicated below and that the fabric samples measured 17.7 × 20.3 cm.:

| Sample | Laminating Temperature °C. | Laminating Pressure kg./cm.$^2$ | Dwell Time Min. | Results |
|---|---|---|---|---|
| A | 282 | 0.21 | 3 | Good adhesion and good fabric standoff |
| B | 282 | 0.21 | 2 | Poor adhesion |
| C[1] | 276 | 0.21 | 2 | Poor adhesion |
| D | 276 | 0.35 | 4 | Good adhesion, high fabric standoff |
| E | 276 | 0.525 | 4 | Good adhesion, high fabric standoff |
| F | 276 | 1.75 | 4 | Good adhesion and good fabric standoff |
| G | 276 | 1.75 | 2 | Low adhesion |

[1]Copolymer sheeting on top of the knitted glass fabric and thereby closest to heated upper platen.

The temperature in this Example was obtained using a surface pryometer. The main criterion for judging the quality of the adhesion was appearance, i.e., the embedding of the sheet into the fabric could be seen. Poor adhesion means that some portion of the sheet was not embedded in the fabric.

EXAMPLE 3

Composite structures were made from the same materials and essentially the same process as in Example 1 except that in one experiment the knitted fabric was a jersey knit made using 3½ needles per inch and the yarn consisted of four ends of ECG 150 fiberglass yarn and four ends of the 0.013 cm. diameter copolymer monofilament. In another embodiment, the same jersey knit was used except that it was made using 7 needles per inch. A composite structure containing the latter knit fabric was thermoformed using the apparatus and procedure of FIGS. 16 and 17 into the shape of a dished head of about 26.7 cm. in diameter and 6.7 cm. deep.

EXAMPLE 4

Composite structures of the present invention can be made by laminating at the nip between two rolls as demonstrated by the following experiment: The knit fabric (no silane coating) and copolymer sheet of Example 1 were brought together and passed through the nip between a pair of 15 cm. diameter rolls, one of which was heated to about 425°C. and the other of which was coated with silicone rubber and cooled. The glass fabric faced the heated roll. Pressure at the nip was 10.5 kg./cm.$^2$ and the rate of passage through the nip of about 27 cm. per minute. The 180° peel strength of the resultant composite structure was 220 kg./m. of width which compared favorably with the peel strength between etched tetrafluoroethylene/hexafluoropropylene copolymer and epoxy resin.

While very high peel strengths between the knitted glass fabric and resin sheet components of composite structures of the present invention can be obtained, e.g., higher than the 35 lb./inch of width (630 kg./m.) good for rubber linings, the composite structures need not be made to have such high peel strength because of the permanent nature of the mechanical bond obtained in the present invention. In addition, when thin resin sheets are used, attempts to determine peel strength can result in tearing of the resin sheet, instead of peeling the sheet from the fabric. Thus, for many applications for composite structures of the present invention a peel strength between knit glass fabric and resin sheet of at least 10 lb./inch of width (179 kg./m.) will be adequate. The peel strength is measured on a sample of composite structure 2.54 cm. × 12.7 cm. in which the fabric and sheet are separated from one another inwardly 2.54 cm. from one end. The separated ends of fabric and sheet are clamped in the jaws of a tensile tester (Instron), one of which is operated to move apart at a rate of 5.08 cm. per minute perpendicular from the other jaw so as to peel the sheet at an angle of 180° from the fabric. An average of the results for five test samples is taken as the peel strength.

As many apparently widely different embodiments of this invention may be made without departing from the spirit and scope thereof, it is to be understood that this invention is not limited to the specific embodiments thereof described herein.

The embodiments of the invention in which an exclusive property or privilege is claimed are defined as follows:

1. A composite structure comprising a substantially flat thermoformable sheet of a melt-fabricable perhalopolyfluoroethylene polymer resin and a knitted fabric made of glass fiber yarn and at least one monofilament of a melt-fabricable perhalopolyfluoroethylene polymer resin, said fabric being partially embedded in a surface of said sheet.

2. The composite structure of claim 1 wherein said melt-fabricable perhalopolyfluoroethylene polymer resin is a melt-fabricable tetrafluoroethylene copolymer resin.

3. The composite structure of claim 2 wherein the melt-fabricable tetrafluoroethylene copolymer resin in the sheet and in the monofilament is a tetrafluoroethylene/hexafluoropropylene copolymer.

4. The composite structure of claim 2 wherein the melt-fabricable tetrafluoroethylene copolymer resin in the sheet and in the monofilament is a tetrafluoroethylene/perfluoro(propyl vinyl ether) copolymer.

5. The composite structure of claim 2 wherein the melt-fabricable tetrafluoroethylene copolymer resin in the sheet and in the monofilament is a tetrafluoroethylene/ethylene copolymer.

6. The composite structure of claim 1 and castable adhesive or thermosetting resin material embedded in the exposed surface of said fabric.

7. The composite structure of claim 6 wherein said castable material contains reinforcement.

8. The composite structure of claim 1 in the form of a liner for a dished head.

9. The composite structure of claim 1 in the form of a cylinder.

10. The composite structure of claim 1 having an extensibility of at least 10 percent.

* * * * *